United States Patent
Sasaki

(10) Patent No.: US 12,224,430 B2
(45) Date of Patent: Feb. 11, 2025

(54) POSITIVE ELECTRODE MATERIAL AND BATTERY

(71) Applicant: Panasonic Intellectual Property Management Co., Ltd., Osaka (JP)

(72) Inventor: Izuru Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 664 days.

(21) Appl. No.: 17/506,720

(22) Filed: Oct. 21, 2021

(65) Prior Publication Data
US 2022/0045318 A1  Feb. 10, 2022

Related U.S. Application Data

(63) Continuation of application No. PCT/JP2020/018121, filed on Apr. 28, 2020.

(30) Foreign Application Priority Data

Jun. 26, 2019  (JP) ................. 2019-118144

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/131* (2013.01); *H01M 4/525* (2013.01);
(Continued)

(58) Field of Classification Search
None
See application file for complete search history.

(56) References Cited

U.S. PATENT DOCUMENTS 1,670,775 A * 5/1928 Loomis ............. G10D 9/047
984/145
11,427,477 B2 * 8/2022 Sakai ............. H01M 10/0562
(Continued)

FOREIGN PATENT DOCUMENTS

| JP | 2006-244734 | 9/2006 |
|---|---|---|
| JP | 2015-072818 | 4/2015 |
| WO | 2007/004590 | 1/2007 |

OTHER PUBLICATIONS

Tomita et al. Substitution effect of ionic conductivity in lithium ion conductor, LI3INBR6-xCLX, Solid State Ionics 179 (2008) 867-870, available at https://www.sciencedirect.com/science/article/pii/S0167273808001793 (Year: 2008).*
(Continued)

*Primary Examiner* — Scott J. Chmielecki
(74) *Attorney, Agent, or Firm* — Rimon P.C.

(57) ABSTRACT

A positive electrode material contains at least one positive electrode active material, a solid electrolyte, and a coating material. The solid electrolyte is represented by formula (1), $$\text{Li}_\alpha \text{M}_\beta \text{X}_\gamma \qquad (1)$$

where $\alpha$, $\beta$, and $\gamma$ are each independently a value greater than 0, M includes at least one element selected from the group consisting of non-Li metals and metalloids, and X includes at least one selected from the group consisting of F, Cl, Br, and I. The coating material covers the surface of the positive electrode active material and contains lithium carbonate.

12 Claims, 2 Drawing Sheets

(51) Int. Cl.
*H01M 4/131* (2010.01)
*H01M 4/525* (2010.01)
*H01M 10/0525* (2010.01)
*H01M 10/0562* (2010.01)

(52) U.S. Cl.
CPC ............ *H01M 10/0525* (2013.01); *H01M 10/0562* (2013.01); *H01M 2004/028* (2013.01); *H01M 2300/008* (2013.01)

(56) References Cited

U.S. PATENT DOCUMENTS

| | | | | |
|---|---|---|---|---|
| 11,560,320 B2* | 1/2023 | Asano | ............... | H01M 10/052 |
| 11,652,235 B2* | 5/2023 | Sasaki | ............... | H01M 4/525 |
| | | | | 429/304 |
| 11,760,649 B2* | 9/2023 | Sakai | ............... | H01M 10/052 |
| | | | | 429/323 |
| 11,949,064 B2* | 4/2024 | Oshima | ............... | H01M 4/582 |
| 12,095,027 B2* | 9/2024 | Sakai | ............... | H01M 10/0562 |
| 12,095,030 B2* | 9/2024 | Nishio | ............... | H01M 10/0525 |
| 12,119,487 B2* | 10/2024 | Sakaida | ............... | H01M 10/0525 |
| 2009/0081554 A1 | 3/2009 | Takada et al. | | |
| 2019/0097268 A1* | 3/2019 | Mimura | ............... | H01M 10/052 |
| 2020/0328453 A1* | 10/2020 | Sakai | ............... | H01M 10/0562 |
| 2020/0328455 A1* | 10/2020 | Sakai | ............... | H01M 4/62 |
| 2020/0343526 A1* | 10/2020 | Oakes | ............... | C09D 127/12 |
| 2020/0350622 A1* | 11/2020 | Sakaida | ............... | H01M 10/0562 |
| 2021/0261430 A1* | 8/2021 | Nishio | ............... | C04B 35/50 |
| 2021/0328262 A1* | 10/2021 | Nishio | ............... | H01M 10/0525 |

OTHER PUBLICATIONS

Asano et al., Solid Halide Electrolytes with High Lithium-Ion Conductivity for Application in 4 V Class Bulk-Type All-Solid-State Batteries, Adv. Mater. 2018. 30, 1803075 (Year: 2018).*
International Search Report of PCT application No. PCT/JP2020/018121 dated Jul. 21, 2020.
Tetsuya Asano et al., "Solid Halide Electrolytes with High Lithium-Ion Conductivity for Application in 4 V Class Bulk-Type All-Solid-State Batteries", Advanced Materials, 2018, vol. 30, Issue 44, Sep. 14, 2018, 1803075 (1-7).
Alysia Zevgolis et al., "Alloying effects on superionic conductivity in lithium indium halides for all-solid-state batteries", APL Materials, vol. 6, Issue 4, Feb. 26, 2018, 047903(1-8).

* cited by examiner

POSITIVE ELECTRODE MATERIAL AND BATTERY

BACKGROUND

1. Technical Field

The present disclosure relates to a positive electrode material for batteries and to a battery.

2. Description of the Related Art

Japanese Unexamined Patent Application Publication No. 2006-244734 discloses an all-solid-state battery made with an indium-containing halide as the solid electrolyte.

International Publication No. 2007/004590 discloses an all-solid-state lithium battery that includes a sulfide-containing lithium-ion-conducting solid electrolyte and an active material having a surface coated with a lithium-ion-conducting oxide.

SUMMARY

One non-limiting and exemplary embodiment provides a battery further improved in charge and discharge efficiency.

In one general aspect, the techniques disclosed here feature a positive electrode material. The positive electrode material contains at least one positive electrode active material, a solid electrolyte, and a coating material. The solid electrolyte is represented by composition formula (1), $$Li_\alpha M_\beta X_\gamma \tag{1}$$

where $\alpha$, $\beta$, and $\gamma$ are each independently a value greater than 0, M includes at least one element selected from the group consisting of non-Li metals and metalloids, and X includes at least one selected from the group consisting of F, Cl, Br, and I. The coating material covers a surface of the positive electrode active material and contains lithium carbonate.

According to certain aspects of the present disclosure, the charge and discharge efficiency of batteries is improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
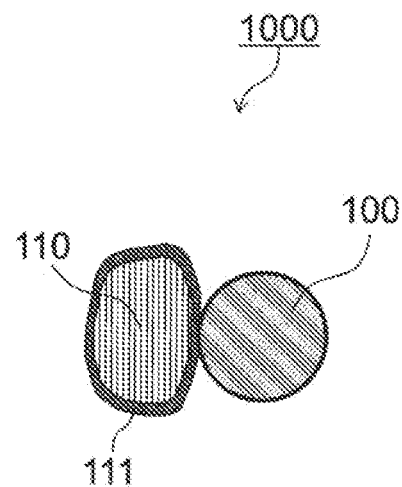
FIG. 1 is a cross-sectional diagram illustrating a schematic structure of a positive electrode material in Embodiment 1.

Overview of Aspects According to the Present Disclosure

A positive electrode material according to a first aspect of the present disclosure contains:
at least one positive electrode active material;
a solid electrolyte; and
a coating material.

The solid electrolyte is represented by composition formula (1), $$Li_\alpha M_\beta X_\gamma \tag{1}$$

where $\alpha$, $\beta$, and $\gamma$ are each independently a value greater than 0, M includes at least one element selected from the group consisting of non-Li metals and metalloids, and X includes at least one selected from the group consisting of F, Cl, Br, and I.

The coating material covers a surface of the positive electrode active material and contains lithium carbonate.

According to the first aspect, the charge and discharge efficiency of the battery is improved.

In a second aspect of the present disclosure, for example, the M for the positive electrode material according to the first aspect may include yttrium.

In a third aspect of the present disclosure, for example, it may be that $2.5 \leq \alpha \leq 3$, $1 \leq \beta \leq 1.1$, and $\gamma=6$ for the positive electrode material according to the first or second aspect.

In a fourth aspect of the present disclosure, for example, the X for the positive electrode material according to any one of the first to third aspects may include at least one selected from the group consisting of Br and I.

In a fifth aspect of the present disclosure, for example, the percentage of the weight of the lithium carbonate to that of the positive electrode active material in the positive electrode material according to any one of the first to fourth aspects may be larger than or equal to 1.3% by weight and smaller than or equal to 4.0% by weight.

According to the second to fifth aspects, the ionic conductivity of the solid electrolyte is further improved.

In a sixth aspect of the present disclosure, for example, the coverage of the surface of the positive electrode active material by the coating material in the positive electrode material according to any one of the first to fifth aspects may be greater than or equal to 31.1%.

In a seventh aspect of the present disclosure, for example, the positive electrode active material in the positive electrode material according to any one of the first to sixth aspects may include a lithium nickel cobalt manganese oxide.

According to the sixth and seventh aspects, the energy density of the battery and the charge and discharge efficiency of the battery are further increased.

A battery according to an eighth aspect of the present disclosure includes:

a positive electrode containing the positive electrode material according to any one of the first to seventh aspects;

a negative electrode; and an electrolyte layer between the positive electrode and the negative electrode.

According to the eighth aspect, for example, the battery has improved charge and discharge efficiency by virtue of being made with the positive electrode material according to any one of the first to seventh aspects.

In a ninth aspect of the present disclosure, for example, the electrolyte layer of the battery according to the eighth aspect may contain the solid electrolyte. In such a configuration, the charge and discharge efficiency of the battery is improved.

In a tenth aspect of the present disclosure, for example, the electrolyte layer of the battery according to the eighth or ninth aspect may contain a halide solid electrolyte different from the solid electrolyte. In such a configuration, the power density of the battery and the charge and discharge efficiency of the battery are improved.

In an eleventh aspect of the present disclosure, for example, the electrolyte layer in the battery according to any one of the eighth to tenth aspects may contain a sulfide solid electrolyte. In such a configuration, the energy density of the battery is improved.

The following describes embodiments of the present disclosure with reference to drawings.

Embodiment 1

A positive electrode material in Embodiment 1 contains at least one positive electrode active material, a solid electrolyte, and a coating material.

The solid electrolyte is a material represented by composition formula (1).

$$Li_\alpha M_\beta X_\gamma \quad (1)$$

In the formula, $\alpha$, $\beta$, and $\gamma$ are each independently a value greater than 0.

M includes at least one element selected from the group consisting of non-Li metals and metalloids. M may be at least one element selected from the group consisting of non-Li metals and metalloids.

X includes at least one selected from the group consisting of F, Cl, Br, and I. X may be at least one selected from the group consisting of F, Cl, Br, and I.

The coating material covers the surface of the positive electrode active material and contains lithium carbonate.

This configuration helps improve the charge and discharge efficiency of the battery.

Japanese Unexamined Patent Application Publication No. 2006-244734 mentions, in the context of all-solid-state secondary batteries including a solid electrolyte that is an indium-containing compound, it is desirable that the potential versus Li of the positive electrode active material be smaller than or equal to 3.9 V on average. This, according to Japanese Unexamined Patent Application Publication No. 2006-244734, ensures a product of oxidative decomposition of the solid electrolyte will form a good coating, giving the battery good charge and discharge characteristics. The literature also discloses common layered transition metal oxide positive electrodes, such as $LiCoO_2$ and $LiNi_{0.8}Co_{0.15}Al_{0.05}O_2$, as positive electrode active materials having a potential versus Li smaller than or equal to 3.9 V on average. The publication leaves the exact mechanism of the oxidative decomposition unclear.

After extensive research, the inventors found that for batteries made with a halide solid electrolyte as a solid electrolyte, the halide solid electrolyte oxidatively decomposes during charging even if the positive electrode active material has a potential versus Li smaller than or equal to 3.9 V on average. The inventors have discovered the problem that oxidative decomposition of the halide solid electrolyte during charging affects the charge and discharge efficiency of the battery. As a cause of this, the inventors have identified the oxidation of the halogen(s) in the halide solid electrolyte.

Specifically, besides the ordinary charging reaction, in which lithium and electrons are extracted from the positive electrode active material in the positive electrode material, a side reaction occurs, in which electrons are also extracted from the halide solid electrolyte touching the positive electrode active material. Electric charge is therefore consumed by the side reaction. As a result, the inventors believe, the charge and discharge efficiency of the battery decreases.

As a result of the oxidation of the halide solid electrolyte, furthermore, an oxide layer, which does not conduct lithium ions well, forms between the positive electrode active material and the halide solid electrolyte. The oxide layer, the inventors believe, functions as a large interfacial resistance during the electrode reaction at the positive electrode. To eliminate this problem, the manufacturer needs to limit the transfer of electrons into and out of the halide solid electrolyte and prevent the formation of the oxide layer thereby.

The configuration according to this embodiment of the present disclosure has an interposed coating material between a positive electrode active material and a halide solid electrolyte. The coating material can limit the transfer of electrons into and out of the halide solid electrolyte. The side reaction involving the halide solid electrolyte, therefore, does not occur easily, and this can improve the charge and discharge efficiency of the battery. The prevention of the side reaction will prevent the formation of the oxide layer, potentially reducing the interfacial resistance during the electrode reaction.

International Publication No. 2007/004590 discloses an all-solid-state lithium battery that includes a sulfide-containing lithium-ion-conducting solid electrolyte and an active material having a surface coated with a lithium-ion-conducting oxide. Using lithium niobate ($LiNbO_3$) as the lithium-ion-conducting oxide will reduce the interfacial resistance during the electrode reaction, helping improve power characteristics significantly. For such reasons, lithium niobate has been the most common coating material for a positive electrode active material in a positive electrode material that contains a sulfide-containing lithium-ion-conducting solid electrolyte.

The inventors have found that in the context of a battery containing a halide solid electrolyte in its positive electrode material, the improvement in charge and discharge efficiency is much greater with a coating material containing lithium carbonate than with a coating material containing lithium niobate. That is, the inventors have found that the coating material that produces a significant effect varies according to the type of solid electrolyte. The principle is unclear, but the inventors believe many factors play a role in a complex manner, including the voltage resistance of the coating material, the voltage resistance of the lithium-ion-conducting solid electrolyte, the reactivity between the coating material and the active material, and the reactivity between the coating material and the solid electrolyte.

The "metalloids" are B, Si, Ge, As, Sb, and Te.

The "metals" are all elements in groups 1 to 12 in the periodic table excluding hydrogen and all elements in groups 13 to 16 excluding B, Si, Ge, As, Sb, Te, C, N, P, O, S, and Se. In other words, the "metals" are the group of those elements that can become cations when they form an inorganic compound with a halide.

In composition formula (1), M may include Y (=yttrium).

That is, the solid electrolyte may contain Y as a metal.

In this configuration, the ionic conductivity of the solid electrolyte is further improved. This helps further improve the charge and discharge efficiency of the battery.

The solid electrolyte containing Y may be, for example, a compound represented by the composition formula $Li_aMe_bY_cX_6$, where $a+mb+3c=6$, and $c>0$. Me is at least one element selected from the group consisting of non-Li and non-Y metals and metalloids, m is the valency of Me.

Me may be at least one selected from the group consisting of Mg, Ca, Sr, Ba, Zn, Sc, Al, Ga, Bi, Zr, Hf, Ti, Sn, Ta, and Nb.

In this configuration, the ionic conductivity of the solid electrolyte is further improved.

In composition formula (1), it may be that $2.5 \leq \alpha \leq 3$, $1 \leq \beta \leq 1.1$, and $\gamma = 6$.

In this configuration, the ionic conductivity of the solid electrolyte is further improved. This helps further improve the charge and discharge efficiency of the battery.

In composition formula (1), X (=anion(s)) may include at least one selected from the group consisting of Br (=bromine) and I (=iodine). In composition formula (1), X may be at least one selected from the group consisting of Br and I.

In this configuration, the ionic conductivity of the solid electrolyte is further improved. This helps further improve the charge and discharge efficiency of the battery.

The solid electrolyte contained in the positive electrode material herein may be referred to as "the first solid electrolyte."

After extensive research by the inventors, it was found that the resistance of the solid electrolyte to oxidative decomposition varies according to what kind(s) and percentage(s) of element(s) the anion(s) includes. The solid electrolyte is prone to oxidative decomposition particularly when X includes at least one selected from the group consisting of Br and I. The ions of Br and I have a large radius, which means these ions would interact with the cationic component of the halide solid electrolyte only weakly. As a result, the inventors believe, electrons would be extracted from the Br or I easily, and the solid electrolyte would be prone to oxidation. When X includes at least one selected from the group consisting of Br and I, the prevention of the oxidative decomposition of the solid electrolyte by placing a coating material on the surface of the active material brings a greater advantage because the solid electrolyte is prone to oxidative decomposition in that case.

In this configuration, the charge and discharge efficiency of the battery is further improved.

The first solid electrolyte may be represented by composition formula (A1).

$$Li_{6-3d}Y_dX_6 \tag{A1}$$

In composition formula (A1), X is two or more elements selected from the group consisting of F, Cl, Br, and I.

In composition formula (A1), $0<d<2$.

In this configuration, the ionic conductivity of the first solid electrolyte is further improved. This helps further improve the charge and discharge efficiency of the battery.

The first solid electrolyte may be represented by composition formula (A2).

$$Li_3YX_6 \tag{A2}$$

In composition formula (A2), X is two or more elements selected from the group consisting of F, Cl, Br, and I.

In this configuration, the ionic conductivity of the first solid electrolyte is further improved. This helps further improve the charge and discharge efficiency of the battery.

The first solid electrolyte may be represented by composition formula (A3).

$$Li_{3-3\delta}Y_{1+\delta}Cl_6 \tag{A3}$$

In composition formula (A3), $0<\delta \leq 0.15$.

In this configuration, the ionic conductivity of the first solid electrolyte is further improved. This helps further improve the charge and discharge efficiency of the battery.

The first solid electrolyte may be represented by composition formula (A4).

$$Li_{3-3\delta}Y_{1+\delta}Br_6 \tag{A4}$$

In composition formula (A4), $0<\delta \leq 0.25$.

In this configuration, the ionic conductivity of the first solid electrolyte is further improved. This helps further improve the charge and discharge efficiency of the battery.

The first solid electrolyte may be represented by composition formula (A5).

$$Li_{3-3\delta+a}Y_{1+\delta-a}Me_aCl_{6-x-y}Br_xI_y \tag{A5}$$

In composition formula (A5), Me includes at least one selected from the group consisting of Mg, Ca, Sr, Ba, and Zn. Me may be at least one selected from the group consisting of Mg, Ca, Sr, Ba, and Zn.

In composition formula (A5), $-1<\delta<2$, $0<a<3$, $0<(3-3\delta+a)$, $0<(1+\delta-a)$, $0 \leq x \leq 6$, $0 \leq y \leq 6$, and $(x+y) \leq 6$.

In this configuration, the ionic conductivity of the first solid electrolyte is further improved. This helps further improve the charge and discharge efficiency of the battery.

The first solid electrolyte may be represented by composition formula (A6).

$$Li_{3-3\delta}Y_{1+\delta-a}Me_aCl_{6-x-y}Br_xI_y \tag{A6}$$

In composition formula (A6), Me includes at least one selected from the group consisting of Al, Sc, Ga, and Bi. Me may be at least one selected from the group consisting of Al, Sc, Ga, and Bi.

In composition formula (A6), $-1<\delta<1$, $0<a<2$, $0<(1+\delta-a)$, $0 \leq x \leq 6$, $0 \leq y \leq 6$, and $(x+y) \leq 6$.

In this configuration, the ionic conductivity of the first solid electrolyte is further improved. This helps further improve the charge and discharge efficiency of the battery.

The first solid electrolyte may be represented by composition formula (A7).

$$Li_{3-3\delta-a}Y_{1+\delta-a}Me_aCl_{6-x-y}Br_xI_y \tag{A7}$$

In composition formula (A7), Me includes at least one selected from the group consisting of Zr, Hf, and Ti. Me may be at least one selected from the group consisting of Zr, Hf, and Ti.

In composition formula (A7), $-1<\delta<1$, $0<a<1.5$, $0<(3-3\delta-a)$, $0<(1+\delta-a)$, $0 \leq x \leq 6$, $0 \leq y \leq 6$, and $(x+y) \leq 6$.

In this configuration, the ionic conductivity of the first solid electrolyte is further improved. This helps further improve the charge and discharge efficiency of the battery.

The first solid electrolyte may be represented by composition formula (A8).

$$Li_{3-3\delta-2a}Y_{1+\delta-a}Me_aCl_{6-x-y}Br_xI_y \tag{A8}$$

In composition formula (A8), Me includes at least one selected from the group consisting of Ta and Mb. Me may be at least one selected from the group consisting of Ta and Mb.

In composition formula (A8), $-1<\delta<1$, $0<a<1.2$, $0<(3-3\delta-2a)$, $0<(1+\delta-a)$, $0 \leq x \leq 6$, $0 \leq y \leq 6$, and $(x+y) \leq 6$.

In this configuration, the ionic conductivity of the first solid electrolyte is further improved. This helps further improve the charge and discharge efficiency of the battery.

The X (=anion(s)) in the first solid electrolyte, which includes at least one selected from the group consisting of F, Cl, Br, and I, may further include oxygen.

In this configuration, the ionic conductivity of the first solid electrolyte is further improved. This helps further improve the charge and discharge efficiency of the battery.

Examples of compounds that can be used as first solid electrolytes include $Li_3YX_6$, $Li_2MgX_4$, $Li_2FeX_4$, $Li(Al,Ga,In)X_4$, and $Li_3(Al,Ga,In)X_6$.

The positive electrode active material includes a material having a tendency to store and release metal ions (e.g., lithium ions). Examples of materials that can be used as positive electrode active materials include lithium-containing transition metal oxides, transition metal fluorides, polyanionic materials, fluorinated polyanionic materials, transition metal sulfides, transition metal oxysulfides, and transition metal oxynitrides. In particular, using lithium-containing transition metal oxide(s) as positive electrode active material(s) helps reduce the production cost and increase the average discharge voltage.

In Embodiment 1, the positive electrode active material may include a lithium nickel cobalt manganese oxide. The positive electrode active material may be a lithium nickel cobalt manganese oxide. For example, the positive electrode active material may be $Li(NiCoMn)O_2$.

In this configuration, the energy density of the battery and the charge and discharge efficiency of the battery are further increased.

The coating material contains lithium carbonate. With its low electronic conductivity and high voltage resistance, lithium carbonate can limit the transfer of electrons between the positive electrode active material and the first solid electrolyte and prevent the oxidation of the first solid electrolyte thereby. The reactivity between the positive electrode active material and lithium carbonate is low, and so is the reactivity between the halide solid electrolyte in the first solid electrolyte and lithium carbonate. Across the interface between the positive electrode active material and lithium carbonate and the interface between the halide solid electrolyte and lithium carbonate, therefore, the movement of lithium ions is smooth, or, in other words, low-resistance interfaces can be formed. As a result, the charge and discharge efficiency of the battery is further improved.

The coating material contains the lithium carbonate as its primary ingredient. "The primary ingredient" is the ingredient that is the most abundant in the coating material on a weight basis. The coating material may further contain inevitable impurities, the starting materials used to form the coating material, by-products, decomposition products, etc.

The lithium carbonate content of the coating material may be, for example, 100% of the coating material as a whole on a weight basis (100% by weight), excluding inevitable contaminants.

FIG. 1 is a cross-sectional diagram illustrating a schematic structure of a positive electrode material 1000 in Embodiment 1.

The positive electrode material 1000 in Embodiment 1 includes first solid electrolyte particles 100, positive electrode active material particles 110, and a coating layer 111.

The coating layer 111 is a layer that contains the coating material. That is, there is a coating layer 111 on at least part of the surface of the positive electrode active material particles 110.

The coating material covers the surface of the positive electrode active material particles 110. To be more exact, the coating material is in direct contact with the positive electrode active material particles 110.

The positive electrode active material particles 110 and the first solid electrolyte particles 100 are separated by the coating layer 111 and are not in direct contact. In other words, the positive electrode active material and the first solid electrolyte are separated by the coating material and are not in direct contact.

The percentage of the weight of lithium carbonate in the coating material to that of the positive electrode active material particles 110 may be larger than or equal to 1.3% by weight and smaller than or equal to 4.0% by weight. A properly adjusted percentage of the weight of the positive electrode active material particles 110 to that of lithium carbonate can ensure the transfer of electrons between the positive electrode active material particles 110 and the first solid electrolyte particles 100 will be sufficiently minor.

An example of how to calculate the percentage of the weight of lithium carbonate in the coating material to that of the positive electrode active material particles 110 is the following method.

Positive electrode active material particles 110 covered with the coating material are immersed in water to make the coating material dissolve. The quantity of dissolved carbonate ions is determined by ion chromatography. The weight of lithium carbonate is calculated from the quantity of carbonate ions. Using the weight of the positive electrode active material particles 110 employed for preparation and the calculated weight of lithium carbonate, the percentage of the weight of lithium carbonate in the coating material to that of the positive electrode active material particles 110 is calculated.

Another method is to use ICP emission spectrometry and x-ray photoelectron spectroscopy (XPS). Positive electrode active material particles 110 covered with the coating material are immersed in water to make the coating material dissolve. The weight of dissolved lithium is determined by ICP emission spectrometry. Using the weight of the positive electrode active material particles 110 employed for production and the weight of dissolved lithium, the percentage A of the weight of lithium in the coating material to that of the positive electrode active material particles 110 is calculated. The weight of lithium includes lithium contained in the lithium carbonate and that in any other lithium salt. Apart from this, positive electrode active material particles 110 covered with the coating material is analyzed by XPS. The abundance of lithium is calculated from the Li 1s spectrum. The abundance of the carbonate ion is calculated from the C 1s spectrum. The abundance of lithium includes lithium contained in the lithium carbonate and that in any other lithium salt. The abundance of the carbonate ion is that of lithium carbonate. From the abundance of lithium and that of the carbonate ion, the percentage B of the abundance of lithium carbonate in the coating material to that of lithium is calculated. A×B gives the percentage of the weight of lithium carbonate in the coating material to that of the positive electrode active material particles 110.

The coverage of the surface of the positive electrode active material particles 110 by lithium carbonate can be calculated using, for example, x-ray photoelectron spectroscopy (XPS). Specifically, the C 1s spectrum and the 2p spectra of transition metals are measured. For example, if the transition metals contained in the positive electrode active material particles 110 are Ni, Co, and Mn, the C 1s, Ni 2p, Co 2p, and Mn 2p spectra are measured. Then the areas of the C 1s, Ni $2p_{1/2}$, Ni $2p_{3/2}$, Co $2p_{1/2}$, Co $2p_{3/2}$, Mn $2p_{1/2}$, and Mn $2p_{3/2}$ peaks are calculated. From the relative area of the peak for C to the total area of the peaks for C, Ni, Co, and Mn, the abundance of carbon (atom %) is calculated. The abundance percentages of Ni (atom %), Co (atom %), and Mn (atom %) are calculated likewise. The abundance of transition metals (atom %) is the sum of the abundance percentages of Ni, Co, and Mn. The relative abundance of transition metals to that of carbon is determined. The relative abundance of transition metals to that of carbon represents the percentage exposure of the positive electrode active material particles 110. One hundred percent minus the percentage exposure gives the coverage of the surface of the positive electrode active material by the coating material.

The coverage of the surface of the positive electrode active material particles 110 by the coating material may be greater than or equal to 91.1%. In such a configuration, the energy density of the battery and the charge and discharge efficiency of the battery are further increased. The coverage of the surface of the positive electrode active material particles 110 by the coating material may be smaller than or equal to 100%.

The coating layer 111 may cover the positive electrode active material particles 110 uniformly. This will prevent direct contact between the positive electrode active material particles 110 and the first solid electrolyte particles 100, thereby helping reduce the side reaction involving the first solid electrolyte particles 100. The charge and discharge efficiency of the battery, therefore, will be improved.

The coating layer 111 may cover part of the surface of the positive electrode active material particles 110. Multiple positive electrode active material particles 110 come into direct contact where they have no coating layer 111 on, improving interparticle conduction of elections between the positive electrode active material particles 110. The battery, therefore, can be capable of high-power operation.

The thickness of the coating layer 111 may be larger than or equal to 1 nm and smaller than or equal to 100 nm.

When the thickness of the coating layer 111 is larger than or equal to 1 nm, direct contact wilt be prevented between the positive electrode active material particles 110 and the first solid electrolyte particles 100, which helps reduce the side reaction involving the first solid electrolyte particles 100. The charge and discharge efficiency of the battery, therefore, will be improved.

When the thickness of the coating layer 111 is smaller than or equal to 100 nm, the thickness of the coating layer 111 is not too large. The internal resistance of the battery, therefore, is sufficiently small. As a result, the energy density of the battery is increased.

The thickness of the coating layer 111 may be larger than or equal to 10 nm and smaller than or equal to 40 nm.

When the thickness of the coating layer 111 is larger than or equal to 10 nm, direct contact will be prevented between the positive electrode active material particles 110 and the first solid electrolyte particles 100 to a greater fullness, which helps reduce the side reaction involving the first solid electrolyte particles 100. The charge and discharge efficiency of the battery, therefore, will be improved to a greater degree of sufficiency.

When the thickness of the coating layer 111 is smaller than or equal to 40 nm, the internal resistance of the battery is even smaller. As a result, the energy density of the battery is increased.

It is not critical how to measure the thickness of the coating layer 111. For example, direct observation of the thickness of the coating layer 111 using a transmission electron microscope can be used to determine the thickness of the coating layer 111.

An example of a method for measuring the thickness of the coating layer 111 is as follows. The thickness on a certain particle is measured at any multiple points (e.g., five points), and the average is reported as "the thickness of the coating layer 111 on the certain particle." The thickness of the coating layer is calculated on ten particles in the same way, and the average of the results is reported as "the thickness of the coating layer 111."

The shape of the first solid electrolyte particles 100 in Embodiment 1 is not critical. The shape of the first solid electrolyte particles 100 in Embodiment 1 may be, for example, needle-like, spherical, or ellipsoidal. For example, the shape of the first solid electrolyte particles 100 may be ball-shaped.

When the shape of the first solid electrolyte particles 100 in Embodiment 1 is ball-shaped (e.g., spherical), the median diameter of the first solid electrolyte particles 100 may be smaller than or equal to 100 μm. When the median diameter of the first solid electrolyte particles 100 is smaller than or equal to 100 μm, the positive electrode active material particles 110 and the first solid electrolyte particles 100 can form a good state of dispersion in the positive electrode material 1000. The charge and discharge characteristics of the battery, therefore, are improved. In Embodiment 1, the median diameter of the first solid electrolyte particles 100 may be smaller than or equal to 10 μm.

In this configuration, the positive electrode active material particles 110 and the first solid electrolyte particles 100 can form a good state of dispersion in the positive electrode material 1000.

As mentioned herein, the median diameter of particles is a diameter determined from the size distribution by volume measured by laser diffraction and corresponding to a cumulative volume of 50% (d50).

In Embodiment 1, the median diameter of the first solid electrolyte particles 100 may be smaller than that of the positive electrode active material particles 110.

In this configuration, the first solid electrolyte particles 100 and the positive electrode active material particles 110 can form a better state of dispersion at the electrode.

The shape of the positive electrode active material particles 110 in Embodiment 1 is not critical. The shape of the positive electrode active material particles 110 in Embodiment 1 may be, for example, needle-like, spherical, or ellipsoidal. For example, the shape of the positive electrode active material particles 110 may be ball-shaped.

The median diameter of the positive electrode active material particles 110 may be larger than or equal to 0.1 μm and smaller than or equal to 100 μm.

When the median diameter of the positive electrode active material particles 110 is larger than or equal to 0.1 μm, the positive electrode active material particles 110 and the first solid electrolyte particles 100 can form a good state of dispersion in the positive electrode material 1000. The charge and discharge efficiency of the battery, therefore, can be improved. When the median diameter of the positive electrode active material particles 110 is smaller than or equal to 100 μm, lithium diffusion inside the positive electrode active material particles 110 will be rapid. The battery, therefore, can be capable of high-power operation.

In the positive electrode material 1000 in Embodiment 1, the first solid electrolyte particles 100 and the coating layer 111 may be in contact with each other as illustrated in FIG. 1.

The positive electrode material 1000 in Embodiment 1 may include multiple collections of first solid electrolyte particles 100 and multiple collections of positive electrode active material particles 110.

In the positive electrode material 1000 in Embodiment 1, the quantity of the first solid electrolyte particles 100 and that of the positive electrode active material particles 110 may be the same or may be different.

Production of the First Solid Electrolyte

The first solid electrolyte in Embodiment 1 can be produced by, for example, the following method.

Raw-material powders of binary halides that will give the desired ratio of composition are prepared. For example, if $Li_3YCl_6$ is produced, LiCl and $YCl_3$ are prepared in a molar ratio of 3:1.

At this point, the selection of the raw-material powders determines the elements "M," "Me," and "X" in the above composition formulae. Likewise, adjustments to the kinds and proportions of the raw-material powders and to the processes for their synthesis determine the values of "α," "β," "γ," "d," "δ," "a," "x," and "y."

After the raw-material powders are mixed and ground well, the raw-material powders are reacted together using the method of mechanochemical milling. Alternatively, the raw-material powders may be heat-treated in a vacuum after thorough mixing and grinding.

By such methods, a crystal-phase-containing solid electrolyte having a composition as specified above is obtained.

The structure of the crystal phase (crystal structure) in the solid electrolyte can be determined by customizing the process and parameters for the reaction between the raw-material powders.

Embodiment 2

In the following, Embodiment 2 is described. What has already been described in Embodiment 1 is omitted where appropriate.

Figure 2:
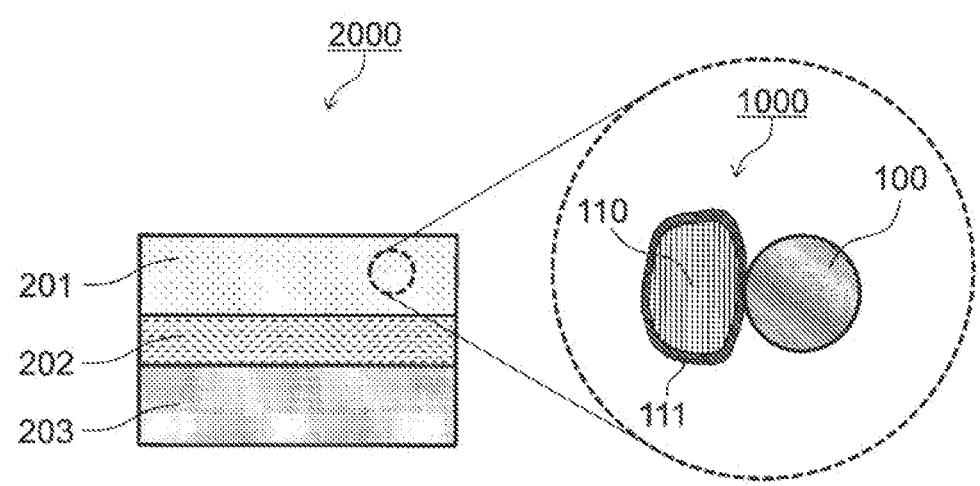
FIG. 2 is a cross-sectional diagram illustrating a schematic structure of a battery in Embodiment 2.

FIG. 2 is a cross-sectional diagram illustrating a schematic structure of a battery 2000 in Embodiment 2.

The battery 2000 in Embodiment 2 includes a positive electrode 201, an electrolyte layer 202, and a negative electrode 203.

The positive electrode 201 contains a positive electrode material 1000 as in Embodiment 1.

The electrolyte layer 202 is between the positive electrode 201 and the negative electrode 203.

In this configuration, the battery has improved charge and discharge efficiency.

The ratio by volume "v1:100−v1" between the positive electrode active material particles 110 and the first solid electrolyte particles 100 in the positive electrode 201 may be such that 30≤v1≤95. v1 represents the percentage by volume of the positive electrode active material particles 110 assuming the total volume of the positive electrode active material particles 110 and the first solid electrolyte particles 100 in the positive electrode 201 is 100. When 30≤v1, the energy density of the battery can be high enough. When v1≤95, the battery can be capable of high-power operation.

The thickness of the positive electrode 201 may be larger than or equal to 10 μm and smaller than or equal to 500 μm. When the thickness of the positive electrode 201 is larger than or equal to 10 μm, the energy density of the battery is high enough. When the thickness of the positive electrode 201 is smaller than or equal to 500 μm, the battery can be capable of high-power operation. That is, when the thickness of the positive electrode 201 is adjusted to be within an appropriate range, the battery combines sufficiently high energy density and high-power operation.

The electrolyte layer 202 is a layer containing an electrolyte. The electrolyte is, for example, a solid electrolyte. That is, the electrolyte layer 202 may be a solid electrolyte layer. The solid electrolyte contained in the electrolyte layer 202 herein may be referred to as "the second solid electrolyte."

An example of a second solid electrolyte, contained in the electrolyte layer 202, is first solid electrolyte particles 100 as in Embodiment 1. In other words, the electrolyte layer 202 may contain a first solid electrolyte as in Embodiment 1.

In this configuration, the charge and discharge efficiency of the battery is further improved.

The second solid electrolyte, contained in the electrolyte layer 202, may be a halide solid electrolyte having a composition different from that of first solid electrolyte particles 100 as in Embodiment 1. In other words, the electrolyte layer 202 may contain a halide solid electrolyte having a composition different from that of first solid electrolyte particles 100 as in Embodiment 1

In this configuration, the power density of the battery and the charge and discharge efficiency of the battery are improved.

The halide solid electrolyte contained in the electrolyte layer 202 may contain Y as a metal.

In this configuration, the power density of the battery and the charge and discharge efficiency of the battery are further improved.

The halide solid electrolyte contained in the electrolyte layer 202 can be a material mentioned as that for the first solid electrolyte particles 100 in Embodiment 1.

The second solid electrolyte, contained in the electrolyte layer 202, may be a sulfide solid electrolyte. In other words, the electrolyte layer 202 may contain a sulfide solid electrolyte.

In this configuration, the energy density of the battery is improved. By virtue of the electrolyte layer 202 containing a sulfide solid electrolyte, which is highly stable against reduction, the battery can be made with a low-potential negative electrode material, such as graphite or metallic lithium.

Sulfide solid electrolytes that can be used include $Li_2S$—$P_2S_5$, $Li_2S$—$SiS_2$, $Li_2SB_2S_3$, $Li_2S$—$GeS_2$, $Li_{3.25}Ge_{0.25}P_{0.75}S_4$, and $Li_{10}GeP_2S_{12}$. These may be doped, for example with LIX, $Li_2O$, $MO_q$, or $Li_pMO_q$. X is at least one selected from the group consisting of F, Cl, Br, and I. M is at least one selected from the group consisting of P, Si, Ge, B, Al, Ga, In, Fe, and Zn. And, p and q are each independently a natural number.

The second solid electrolyte, contained in the electrolyte layer 202, may even be an oxide solid electrolyte, polymer solid electrolyte, or complex hydride solid electrolyte.

Examples of oxide solid electrolytes that can be used include NASICON solid electrolytes, typified by $LiTi_2(PO_4)_3$ and its substituted derivatives, $(LaLi)TiO_3$-based perovskite solid electrolytes, LISICON solid electrolytes, typified by $Li_{14}ZnGe_4O_{16}$, $Li_4SiO_4$, $LiGeO_4$, and their substituted derivatives, garnet-based solid electrolytes, typified by $Li_7La_3Zr_2O_{12}$ and its substituted derivatives, $Li_3PO_4$ and its N-substituted derivatives, and glass or glass-ceramic electrolytes formed by a base Li—B—O compound, such as $LiBO_2$ or $Li_3BO_3$, and a dopant, such as $Li_2SO_4$ or $Li_2CO_3$.

Examples of polymer solid electrolytes that can be used include compounds of a polymer and a lithium salt. The polymer may have the ethylene oxide structure. A polymer having the ethylene oxide structure helps further increase ionic conductivity as it can contain more of the lithium salt. Lithium salts that can be used include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from those listed as examples can be used alone. Alternatively, a mixture of two or more lithium salts selected from those listed as examples can be used.

Examples of complex hydride solid electrolytes that can be used include $LiBH_4$—$LiI$ and $LiBH_4$—$P_2S_5$.

The solid electrolyte layer may contain the second solid electrolyte as its primary ingredient. That is, the percentage of the second solid electrolyte in the solid electrolyte layer may be, for example, larger than or equal to 50% of the solid electrolyte layer as a whole on a weight basis (larger than or equal to 50% by weight).

In this configuration, the charge and discharge characteristics of the battery are further improved.

The percentage of the second solid electrolyte in the solid electrolyte layer may be, for example, larger than or equal to 70% of the solid electrolyte layer as a whole on a weight basis (larger than or equal to 70% by weight).

In this configuration, the charge and discharge characteristics of the battery are further improved.

The solid electrolyte layer may further contain inevitable impurities, the starting materials used to synthesize the second solid electrolyte, by-products, decomposition products, etc., while containing the second solid electrolyte as its primary ingredient.

The percentage of the second solid electrolyte in the solid electrolyte layer may be, for example, 100% of the solid electrolyte layer as a whole on a weight basis (100% by weight), excluding inevitable contaminants.

In this configuration, the charge and discharge characteristics of the battery are further improved.

Accordingly, the solid electrolyte layer may be totally the second solid electrolyte.

The solid electrolyte layer may contain two or more of the materials listed as examples of second solid electrolytes. For example, the solid electrolyte layer may contain a halide solid electrolyte and a sulfide solid electrolyte.

The thickness of the electrolyte layer 202 may be larger than or equal to 1 μm and smaller than or equal to 300 μm. When the thickness of the electrolyte layer 202 is larger than or equal to 1 μm, the positive electrode 201 and the negative electrode 203 do not short-circuit easily. When the thickness of the electrolyte layer 202 is smaller than or equal to 300 μm, the battery can be capable of high-power operation.

The negative electrode 203 contains a material having a tendency to store and release metal ions (e.g., lithium ions). For example, the negative electrode 203 contains a negative electrode active material.

Examples of negative electrode active materials that can be used include metallic materials, carbon materials, oxides, nitrides, tin compounds, and silicon compounds. A metallic material may be a pure metal or may be an alloy. Examples of metallic materials include lithium metal and lithium alloys. Examples of carbon materials include natural graphite, coke, graphitizing carbon, carbon fiber, spherical carbon, artificial graphite, and amorphous carbon. For reasons of capacity per unit area, silicon (Si), tin (Sn), silicon compounds, and tin compounds can be used.

The negative electrode 203 may contain a solid electrolyte. The solid electrolyte may be one mentioned as an example of a material for the electrolyte layer 202. In this configuration, the battery can be capable of high-power operation by virtue of increased conductivity to lithium ions inside the negative electrode 203.

The median diameter of the negative electrode active material may be larger than or equal to 0.1 μm and smaller than or equal to 100 μm. When the median diameter of the negative electrode active material is larger than or equal to 0.1 μm, the negative electrode active material and the solid electrolyte can form a good state of dispersion in the negative electrode. The charge and discharge characteristics of the battery, therefore, are improved. When the median diameter of the negative electrode active material is smaller than or equal to 100 μm, lithium diffusion inside the negative electrode active material will be rapid. The battery, therefore, can be capable of high-power operation.

The median diameter of the negative electrode active material may be greater than that of the solid electrolyte. This allows for the formation of a good state of dispersion between the negative electrode active material and the solid electrolyte.

The ratio by volume "v2:100−v2" between the negative electrode active material and the solid electrolyte in the negative electrode 203 may be such that $30 \leq v2 \leq 95$. v2 represents the percentage by volume of the negative electrode active material assuming the total volume of the negative electrode active material and the solid electrolyte in the negative electrode 203 is 100. When $30 \leq v2$, the energy density of the battery is high enough. When $v2 \leq 95$, the battery can be capable of high-power operation.

The thickness of the negative electrode 203 may be larger than or equal to 10 μm and smaller than or equal to 500 μm. When the thickness of the negative electrode 203 is larger than or equal to 10 μm, the energy density of the battery is high enough. When the thickness of the negative electrode 203 is smaller than or equal to 500 μm, the battery can be capable of high-power operation.

In at least one selected from the group consisting of the positive electrode 201, electrolyte layer 202, and negative electrode 203, a binder may be contained for the purpose of improving adhesion between particles. The binder is used to improve the binding of the material(s) forming the electrode. Examples of binders include polyvinylidene fluoride, polytetrafluoroethylene, polyethylene, polypropylene, aramid resins, polyamides, polyimides, polyamide-imides, polyacrylonitrile, polyacrylic acid, polymethyl acrylate, polymethyl acrylate, polyhexyl acrylate, polymethacrylic acid, polymethyl methacrylate, polyethyl methacrylate, polyhexyl methacrylate, polyvinyl acetate, polyvinylpyrrolidone, polyethers, polyethersulfones, hexafluoropolypropylene, styrene-butadiene rubber, and carboxymethyl cellulose. Copolymers of two or more materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene can be used as binders. Mixtures of two or more selected from these may even be used.

At least one of the positive electrode 201 or negative electrode 203 may contain a conductive additive for the purpose of increasing electronic conductivity. Examples of conductive additives that can be used include the graphite substances, such as natural graphite and artificial graphite, carbon blacks, such as acetylene black and Ketjenblack, conductive fibers, such as carbon fiber and metallic fiber, metallic powders, for example of fluorinated carbon or aluminum, conductive whiskers, for example of zinc oxide or potassium titanate, conductive metal oxides, such as titanium oxide, and conductive polymers, such as polyaniline, polypyrrole, and polythiophene. Using a carbon-based conductive additive as a conductive additive helps reduce the cost.

Examples of shapes the battery in Embodiment 2 can have include a coin, a cylinder, a square, a sheet, a button, a flat plate, and a stack of layers.

EXAMPLES

In the following, the details of certain aspects of the present disclosure are described using examples and comparative examples.

Example 1

Preparation of a First Solid Electrolyte

In an argon glove box with a dew point of −60° C. or lower, the raw-material powders of LiBr, YBr$_3$, LiCl, and YCl$_3$ were weighed out to a molar ratio LiBr:YBr$_3$:LiCl:YCl$_3$=1:1:5:1. The resulting mixture was milled at 600 rpm for 25 hours using a planetary ball mill (Fritsch, P-7), giving a powder of a first solid electrolyte Li$_3$YBr$_2$Cl$_4$.

Preparation of a Positive Electrode Active Material Covered with a Coating Material In an argon glove box, a coating solution was prepared by dissolving 2.3 mg of metallic lithium in 2 g of super-dehydrated ethanol (Wako Pure Chemical).

Three grams of Li(NiCoMn)O$_2$ (hereinafter NCM), which was a positive electrode active material, was weighed out and put into an agate mortar. The coating solution was added gradually to the agate mortar, and the mixture was stirred as it formed.

After all coating solution was added, the mixture was stirred until it visually looked dry.

The dry powder was put into an alumina crucible and heated for 10 hours at 400° C. in an oxygen atmosphere.

The heated powder was ground back into particles in the agate mortar. In this way, the positive electrode active material of Example 1 was obtained as particles with a coating material on their surface layer.

The coating material was lithium carbonate.

Production of the Positive Electrode

In an argon glove box with a dew point of −60° C. or lower, the first solid electrolyte and an SEBS binder were weighed out to a ratio by weight of 1:0.022. The mixture was dissolved or dispersed in p-chlorotoluene as a solvent, giving a slurry of ion-conducting material. Then the first solid electrolyte and the positive electrode active material (NCM covered with a coating material) were weighed out to a ratio by weight of 30:70. The mixture was kneaded for 6 minutes at 1800 rpm using a planetary centrifugal mixer (THINKY, ARE-310), giving positive electrode slurry. The positive electrode slurry was applied to a current collector made of copper foil. The positive electrode slurry was dried for 1 hour at 100° C. in a vacuum to give a positive electrode plate. A 9.2-mm diameter round disk was cut out of the resulting positive electrode plate by punching the hole of that size through the plate. In this way, the positive electrode of Example 1 was produced.

Example 2

Preparation of a Positive Electrode Active Material Covered with a Coating Material The positive electrode active material of Example 2 was obtained as particles with a coating material on their surface layer in the same way Example 1 except that the weight of the metallic lithium dissolved in super-dehydrated ethanol was changed to 5.7 mg.

Production of the Positive Electrode

The positive electrode of Example 2 was obtained in the same way as in Example 1 except that the positive electrode active material used was changed to that of Example 2.

Example 3

Preparation of a Positive Electrode Active Material Covered with a Coating Material The positive electrode active material of Example 3 was obtained as particles with a coating material on their surface layer in the same way Example 1 except that the weight of the metallic lithium dissolved in super-dehydrated ethanol was changed to 11.5 mg.

Production of the Positive Electrode

The positive electrode of Example 3 was obtained in the same way as in Example 1 except that the positive electrode active material used was changed to that of Example 3.

Example 4

Preparation of a Positive Electrode Active Material Covered with a Coating Material The positive electrode active material of Example 4 was obtained as particles with a coating material on their surface layer in the same way Example 1 except that the weight of the metallic lithium dissolved in super-dehydrated ethanol was changed to 22.9 mg.

Production of the Positive Electrode

The positive electrode of Example 4 was obtained in the same way as in Example 1 except that the positive electrode active material used was changed to that of Example 4.

Comparative Example 1

Preparation of a Positive Electrode Active Material

The positive electrode active material of Comparative Example 1 was obtained in the same way Example 1 except that the positive electrode active material was changed to untreated NCM.

Production of the Positive Electrode

The positive electrode of Comparative Example 1 was obtained in the same way as in Example 1 except that the positive electrode active material used was changed to that of Comparative Example 1.

Comparative Example 2

Preparation of a Positive Electrode Active Material Covered with a Coating Material The positive electrode active material of Comparative Example 2 was obtained as particles with a coating material on their surface layer in the same way Example 1 except that the weight of the metallic lithium dissolved in super-dehydrated ethanol was changed to 45.8 mg.

Production of the Positive Electrode

The positive electrode of Comparative Example 2 was obtained in the same way as in Example 1 except that the positive electrode active material used was changed to that of Comparative Example 2.

Comparative Example 3

Preparation of a Positive Electrode Active Material Covered with a Coating Material In an argon glove box, a coating solution was prepared by dissolving 5.95 g of lithium ethoxide (Kojundo Chemical) and 38.43 g of niobium pentaethoxide (Kojundo Chemical) in 500 ml of super-dehydrated ethanol (Wako Pure Chemical).

The formation of the coating material on NCM as the positive electrode active material was with the use of a tumbling fluidized-bed granulating-coating machine (Powrex, FD-MP-01E). The amount of positive electrode active material added was 1 kg. The number of revolutions for stirring was 400 rpm. The rate of solution delivery was 6.59 g/min.

The treated powder was put into an alumina crucible, and the crucible was removed to the ambient atmosphere.

Then the treated powder was heated for 1 hour at 300° C. in the ambient atmosphere.

The heated powder was ground back into particles in an agate mortar. In this way, the positive electrode active material of Comparative Example 3 was obtained as particles with a coating material on their surface layer.

The coating material was lithium niobate ($LiNbO_3$).

Production of the Positive Electrode

The positive electrode of Comparative Example 3 was obtained in the same way as in Example 1 except that the positive electrode active material used was changed to that of Comparative Example 3.

Measurement of the Weight of Lithium Carbonate in the Coating Material

The positive electrode active materials prepared in Examples 1 to 4, Comparative Example 1, and Comparative Example 2 were immersed in water to make the coating material dissolve. The quantity of dissolved carbonate ions was quantitatively analyzed by ion chromatography. The weight of lithium carbonate was calculated from the quantity of carbonate ions. Using the weight of the positive electrode active material employed for preparation and the calculated weight of lithium carbonate, the percentage of the weight of lithium carbonate in the coating material to that of the positive electrode active material was determined.

In this way, the percentage of the weight of lithium carbonate in the coating material to that of the positive electrode active material was determined in Examples 1 to 4, Comparative Example 1, and Comparative Example 2.

Measurement of the Lithium Carbonate Coverage of the Positive Electrode Active Material The positive electrode active materials prepared in Examples 1 to 4, Comparative Example 1, and Comparative Example 2 were analyzed by x-ray photoelectron spectroscopy (XPS). The analysis was with the use of ULVAC-PHI's Quantera SXM. The soft x-ray source was AlKα radiation.

The C 1s, Ni 2p, Co 2p, and Mn 2p spectra of each of the positive electrode active materials prepared in Examples 1 to 4, Comparative Example 1, and Comparative Example 2 were measured. In the spectra obtained, the areas of the C 1s, Ni $2p_{1/2}$, Ni $2p_{3/2}$, Co $2p_{1/2}$, Co $2p_{3/2}$, Mn $2p_{1/2}$, and Mn $2p_{3/2}$ peaks were calculated. From the relative area of the peak for C to the total area of the peaks for C, Ni, Co, and Mn, the abundance of carbon (atom %) was calculated. The abundance percentages of Ni (atom %), Co (atom %), and Mn (atom %) were calculated likewise. The abundance of transition metals (atom %) is the sum of the abundance percentages of Ni, Co, and Mn. The relative abundance of transition metals to that of carbon, which means the percentage exposure of the positive electrode active material particles 110, was determined. The coverage of the surface of the positive electrode active material by the coating material was figured out by subtracting the percentage exposure from 100%. In Example 3, Example 4, and Comparative Example 2, the abundance of transition metals was below the detection limit. In Example 3, Example 4, and Comparative Example 2, therefore, the coverage of the positive electrode active material was 100%.

Preparation of a Sulfide Solid Electrolyte

In an argon glove box with a dew point of −60° C. or lower, the raw-material powders of $Li_2S$ and $P_2S_5$ were weighed out to a molar ratio $Li_2S:P_2S_5$=75:25. The raw-material powders were ground in a mortar to mix. Then the resulting mixture was milled at 510 rpm for 10 hours using a planetary ball mill (Fritsch, P-7), giving a vitreous solid electrolyte. The vitreous solid electrolyte was heated for 2 hours at 270° C. in an inert atmosphere. In this way, $Li_2S$—$P_2S_5$ was obtained as a glass-ceramic solid electrolyte.

Fabrication of Secondary Batteries

Secondary batteries having the positive electrodes of Examples 1 to 4 and Comparative Examples 1 to 3 were fabricated through the following process.

First, 60 mg of $Li_2S$—$P_2S_5$ was put into an insulating casing cylinder, and this was subjected to pressure molding at a pressure of 80 MPa.

Then 20 mg of the first solid electrolyte $Li_3YBr_2Cl_4$ was added, and this was subjected to pressure molding at a pressure of 80 MPa to give a solid electrolyte layer formed by the two layers of $Li_2S$—$P_2S_5$ and $Li_3YBr_2Cl_4$.

Then the positive electrode was added on the side where they would touch the $Li_3YBr_2Cl_4$. This was subjected to pressure molding at a pressure of 360 MPa.

Then, on the side of the solid electrolyte layer opposite the side where it touched the positive electrode, layers of metallic In (200-μm thick), metallic Li (300-μm thick), and metallic In (200-μm thick) were stacked in this order. This was subjected to pressure molding at a pressure of 80 MPa to give a multilayer body formed by a positive electrode, a solid electrolyte layer, and a negative electrode.

Then a stainless steel current collector was placed on the top and bottom of the multilayer body, and current collection lead wires were fitted on the current collectors.

Lastly, the inside of the insulating casing cylinder was isolated from the external atmosphere and sealed using insulating ferrules. In this way, batteries were fabricated.

Charge and Discharge Test

A charge and discharge test of the batteries of Examples 1 to 4 and Comparative Examples 1 to 3 was conducted under the following conditions.

The battery was placed in a thermostatic chamber at 25° C.

The battery was charged at a constant current that would be a C-rate of 0.05C (20-hour rate) relative to the theoretical capacity of the battery, and charging was ended at a voltage of 3.7 V.

Then the battery was discharged at a current that would be a C-rate of 0.05C, and discharging was ended at a voltage of 1.3 V.

Here, the theoretical capacity of the batteries was calculated assuming that the theoretical capacity per unit weight of NCM was 200 mAh/g.

For the batteries of Examples 1 to 4 and Comparative Examples 1 to 3, the charge and discharge capacities were measured, and the initial charge and discharge efficiency was calculated. The initial charge and discharge efficiency is the percentage of the initial discharge capacity to the initial charge capacity.

For each of the batteries of Examples 1 to 4 and Comparative Examples 1 to 3, the percentage of the weight of lithium carbonate in the coating material to that of the positive electrode active material, the lithium carbonate coverage of the surface of the positive electrode active material, and the initial charge and discharge efficiency result are presented in Table 1.

TABLE 1

| | Coating material | Percentage weight of lithium carbonate (wt %) | Coverage (%) | Initial charge and discharge efficiency (%) |
|---|---|---|---|---|
| Example 1 | Lithium carbonate | 1.34 | 91.1 | 91.0 |
| Example 2 | Lithium carbonate | 1.81 | 93.7 | 92.0 |
| Example 3 | Lithium carbonate | 3.13 | 100 | 94.7 |
| Example 4 | Lithium carbonate | 4.00 | 100 | 91.0 |
| Comparative Example 1 | None | 0.95 | 73.3 | 86.6 |
| Comparative Example 2 | Lithium carbonate | 7.47 | 100 | 17.0 |
| Comparative Example 3 | Lithium niobate | — | — | 87.6 |

Figure 3:
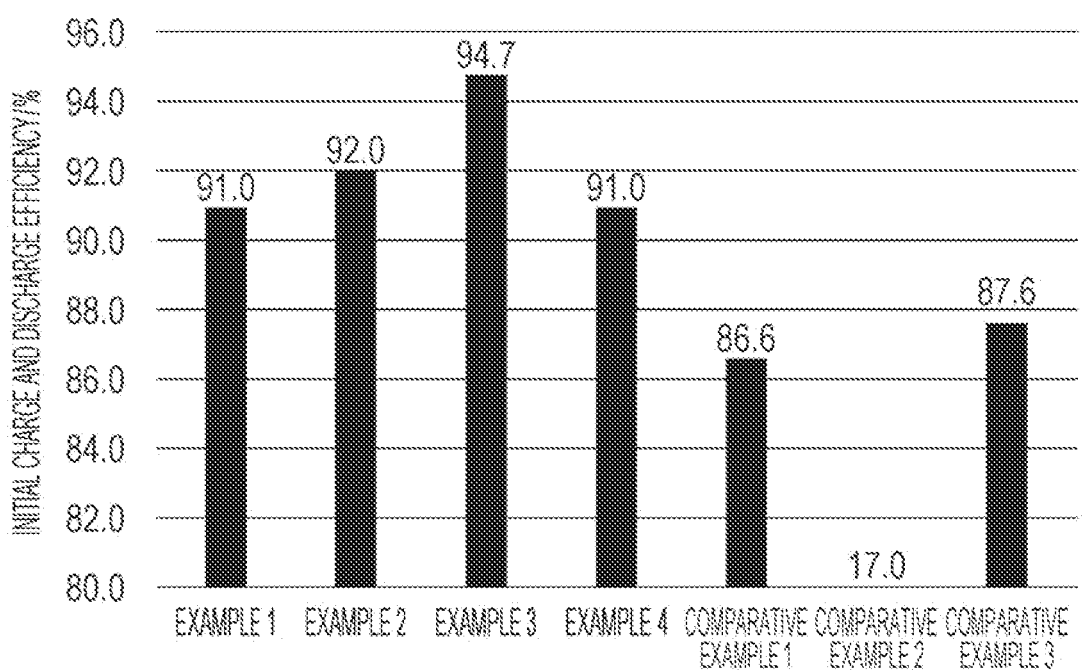
FIG. 3 is a graph of the initial charge and discharge efficiency of the batteries of Examples 1 to 4 and Comparative Examples 1 to 3.

The initial charge and discharge efficiency of each of the batteries of Examples 1 to 4 and Comparative Examples 1 to 3 is presented in FIG. 3.

Discussion

The initial charge and discharge efficiency of the batteries of Example 1 to 4 was higher than that of the batteries of Comparative Examples 1 to 3. A reason for this is that the batteries of Examples 1 to 4 satisfied the relation that the percentage of the weight of lithium carbonate in the coating material to that of the positive electrode active material is larger than or equal to 1.3% by weight and smaller than or equal to 4.0% by weight. For the batteries of Examples 1 to 4 and Comparative Example 2, the lithium carbonate coverage of the surface of the positive electrode active material was greater than or equal to 91.1%. The initial charge and discharge efficiency of the batteries of Example 1 to 4 was higher than that of the battery of Comparative Example 3. A reason for this is that the positive electrode active material used in the batteries of Examples 1 to 4 was covered with lithium carbonate.

From this discussion, the charge and discharge efficiency of a battery is improved when the positive electrode material contains a positive electrode active material, a first solid electrolyte, and a coating material, the first solid electrolyte is represented by composition formula (1), $$Li_\alpha M_\beta X_\gamma \tag{1}$$

where $\alpha$, $\beta$, and $\gamma$ are each independently a value greater than 0, M includes at least one element selected from the group consisting of non-Li metals and metalloids, and X includes at least one selected from the group consisting of F, Cl, Br, and I, and the coating material covers the surface of the positive electrode active material and contains lithium carbonate.

The battery according to an aspect of the present disclosure can be used as, for example, an all-solid-state lithium secondary battery.

What is claimed is:

1. A positive electrode material comprising:
   at least one positive electrode active material;
   a solid electrolyte; and
   a coating material, wherein:
   the solid electrolyte is represented by composition formula (A1), $$Li_{6-3d}Y_d X_6 \tag{A1}$$

where X is two or more elements selected from the group consisting of F, Cl, Br, and I, and d satisfy the relation 0<d<2, and
   the coating material covers a surface of the positive electrode active material and contains lithium carbonate.

2. The positive electrode material according to claim 1, wherein
   a percentage of weight of the lithium carbonate to weight of the positive electrode active material is larger than or equal to 1.3% by weight and smaller than or equal to 4.0% by weight.

3. The positive electrode material according to claim 1, wherein
   coverage of the surface of the positive electrode active material by the coating material is greater than or equal to 91.1%.

4. The positive electrode material according to claim 1, wherein
   the positive electrode active material includes a lithium nickel cobalt manganese oxide.

5. A battery comprising:
   a positive electrode containing the positive electrode material according to claim 1;
   a negative electrode; and
   an electrolyte layer between the positive electrode and the negative electrode.

6. The battery according to claim 5, wherein
   the electrolyte layer contains the solid electrolyte.

7. The battery according to claim 5, wherein
   the electrolyte layer contains a halide solid electrolyte different from the solid electrolyte.

8. The battery according to claim 5, wherein
   the electrolyte layer contains a sulfide solid electrolyte.

9. The positive electrode material according to claim 1, wherein
   the solid electrolyte is represented by the formula $Li_3YBr_2Cl_4$.

10. The positive electrode material according to claim 9, wherein
    the positive electrode active material includes a lithium nickel cobalt manganese oxide.

11. The positive electrode material according to claim 1, wherein
    a percentage of weight of the lithium carbonate to weight of the positive electrode active material is larger than or equal to 1.3% by weight and smaller than or equal to 4.0% by weight, and coverage of the surface of the positive electrode active material by the coating material is greater than or equal to 91.1%.

12. The positive electrode material according to claim 11, wherein
    the positive electrode active material includes a lithium nickel cobalt manganese oxide.

* * * * *